United States Patent
Santais et al.

[19]

[11] Patent Number: 5,863,571
[45] Date of Patent: Jan. 26, 1999

[54] MACHINE FOR MAKING CONTAINERS BY BLOW-MOULDING PLASTIC PARISONS

[75] Inventors: Didier Santais; Thierry Valles, both of Le Havre Cedex, France

[73] Assignee: Sidel S.A., Le Havre, France

[21] Appl. No.: 894,877

[22] PCT Filed: Feb. 29, 1996

[86] PCT No.: PCT/FR96/00309

§ 371 Date: Sep. 2, 1997

§ 102(e) Date: Sep. 2, 1997

[87] PCT Pub. No.: WO96/26826

PCT Pub. Date: Sep. 6, 1996

[30] Foreign Application Priority Data

Mar. 2, 1995 [FR] France .................................. 95 02412

[51] Int. Cl.⁶ ............................ B29C 31/08; B29C 49/64
[52] U.S. Cl. ........................ 425/526; 264/538; 425/534
[58] Field of Search .................................. 425/526, 534; 264/533, 538

[56] References Cited

U.S. PATENT DOCUMENTS

| | | | |
|---|---|---|---|
| 3,850,566 | 11/1974 | Moore | 425/534 |
| 4,313,720 | 2/1982 | Spurr | 425/534 |
| 4,391,578 | 7/1983 | Schaar | 425/534 |
| 4,790,741 | 12/1988 | Takakusaki et al. | 425/526 |
| 5,116,217 | 5/1992 | Doudement et al. | 425/534 |
| 5,232,717 | 8/1993 | Voss | 425/534 |
| 5,308,233 | 5/1994 | Denis et al. | 425/526 |
| 5,683,729 | 11/1997 | Valles | 425/534 |

FOREIGN PATENT DOCUMENTS

| | | |
|---|---|---|
| 2389580 | 12/1978 | France . |
| 2700293 | 7/1994 | France . |
| 2905376 | 8/1980 | Germany . |
| 3529716 | 3/1987 | Germany . |
| 3837118 | 5/1990 | Germany . |
| 2004805 | 4/1979 | United Kingdom . |
| 2074496 | 11/1981 | United Kingdom . |
| WO95/05933 | 3/1995 | WIPO . |

*Primary Examiner*—Robert Davis
*Attorney, Agent, or Firm*—Sughrue, Mion, Zinn, Macpeak & Seas, PLLC

[57] ABSTRACT

The invention concerns a machine for manufacture of containers (13), such as bottles, pots, and all other types of hollow bodies, by heat treating, then blow-molding, plastic preforms (1). The machine includes at least two wallet-type molds (41, 44) positioned on the periphery of a circular conveyor. Each mold incorporates at least two mold cavities. The machine includes a preform heat-treatment apparatus in which the pitch (P1) between the longitudinal axes of two successive preforms is smaller than the pitch (P2) between the longitudinal axes of two adjacent cavities belonging to the same mold, and means (5A) for modifying the pitch of the preforms between the drive mechanism and a mold. The machine is characterized by the fact that the pitch-modification means (5A) incorporate at least two adjacent movable devices (52) which are configured so as to be adjustable to the first pitch (P1) when they are positioned opposite the drive mechanism and to the second pitch (P2) when they are positioned facing the means (5B) designed to transfer the performs to the molds.

21 Claims, 5 Drawing Sheets

MACHINE FOR MAKING CONTAINERS BY BLOW-MOULDING PLASTIC PARISONS

The invention concerns a machine for the manufacture of containers, such as bottles, pots, or any other type of hollow body, by heat treating, then blow-molding, potentially combined with stretching, plastic preforms that have preliminarily undergone a suitable heat treatment.

The invention applies, in particular, to the manufacture of containers made of a thermoplastic material, such as polyethylene terephthalate (PET), polyethylene naphthalate (PEN), copolyester, or an alloy or a mixture of several materials.

Conventional manufacturing machines designed to blow-mold preforms comprise at least the following: one preform heat-treating station in which the performs are heated to a temperature at which they can be reshaped during a blow-molding operation; a station which feeds the preforms to this treatment station; a blow-molding station comprising molds whose cavities incorporate the final outer shape of the container to be produced; and a station for preform transfer between the heat-treatment station and the blow-molding station.

In general, the preform must be stretch-formed at the time it is blow-molded. To this end, a stretch-forming device, such as an extension rod, which at this stage pushes backward the bottom of the preform in a controlled fashion, is linked to the blow-molding station.

The invention encompasses machines with and without stretch-forming devices. Accordingly, in the remainder of this description, the term "blow-molding" refers both to blow-molding alone and to blowing-molding/stretch-forming.

In one conventional type of machine produced by the Applicant, the supporting structure of the blow-molding station is a device mounted so as to rotate around a vertical axis of rotation. This device, termed a wheel or circular conveyor, supports at least two molds, each of which incorporates a mold cavity and is borne by a mold-carrier device and which are normally evenly spaced in relation to the axis of rotation.

In this type of machine, each mold comprises two half-molds jointed around an axis parallel to the axis of rotation of the circular conveyor. These half-molds are mounted in such a way that the molds open in the manner of a wallet toward the periphery of the blow-molding wheel.

In conventional practice, these machines allow high rates of production to be achieved. Thus, using a material such as PET, more than 1,000 containers per hour and per mold can be produced by stretch-forming/blow-molding. As an indication, the largest machines currently manufactured by the Applicant incorporate 40 molds.

In machines of this type, the heat-treatment station comprises holding devices, each of which is configured so as to receive and hold a preform firmly, but detachably, and which are arranged in series so as to constitute an endless-type mechanism. This endless mechanism may be formed either from another circular conveyor or in the form of an endless chain stretched between at least two drive pinions. Furthermore, the holding devices are preferably configured in such a way that the preforms can be heated with their opening (termed the "neck") pointing downward, in order to avoid any convection-induced deformation of this opening during heat treatment.

In addition, conventional machines are, preferably again, configured so that, following heat treatment, the preforms are reversed in such a way that the opening points upward, in order to avoid the situation in which, because of softening, they become deformed because of their own weight as they travel to the container blow-molding station. Depending on the type of machine, this reversing operation takes place in the heat-treatment or in the transfer station.

The operations entailing placement and removal of preforms on a rotating device are called "donning" and "undonning" in the language of those skilled in the art.

In a patent application filed by Applicant but as yet still unpublished, a major disadvantage of these machines is brought to light: i.e., they are in general constructed around mechanical structures (circular conveyor, motors, mold-carriers, etc.) and hydraulic elements, the sizes of which make it possible to produce containers of large size or capacity and/or requiring high parameter values (in particular pressure) for the blow-molding thereof. As a result, if, for example, the containers being manufactured are small, these machines may appear to be oversized in comparison with the containers.

To solve these problems, the aforementioned patent application proposes a machine for container manufacture which functions by blow-molding preliminarily-injected preforms, this machine comprising at least two molds arranged on the periphery of a circular conveyor and in which each of the wallet-type molds comprises at least two mold cavities. Thus, a machine initially fitted out for manufacture of large containers may be used optimally to produce small containers.

This application further specifies that, in the heat-treatment station, the pitch between two successive preforms is less than the pitch between the longitudinal axes of two adjacent cavities in a single mold.

Because of this difference of pitch, means for modifying the pitch of the preforms are provided between the drive mechanism and a mold.

The application cited above mentions various advantages that will not be repeated in detail in the present description (optimal operation of the conventional machines, noteworthy increase of production rates, compactness of the heat-treatment device).

The aforementioned application describes an embodiment of the pitch-modification means using a wheel comprising, on its periphery, an alternating arrangement of stationary and movable notches (each shaped like the arc of a circle) designed to hold the preforms in place and whose action is supplemented by an additional position-retention element formed by a portion of a ring.

However, this structure has the disadvantage of being difficult to use if the molds comprise more than two blow-molding impressions or cavities, since the presence of stationary notches restricts the ability to vary the pitch.

The purpose of the invention thus lies in solving this problem by proposing a perfected machine in which, as required, the pitch between more than two successive preforms may be modified.

In accordance with the invention, a container-manufacturing machine which operates by blow-molding preliminarily-injected preforms comprising:

a device for conveying and holding in position preforms along a path on which a heat-treatment station is positioned, with means designed to keep two successive preforms spaced apart by a first pitch;

at least two molds arranged on the periphery of a circular conveyor, in which the molds are of the wallet type, each comprising at least two mold cavities and in which the longitudinal axes of two adjacent cavities are spaced apart by a second pitch;

means for modifying the pitch of the preforms, in order to cause them to move from the first to the second pitch;

means for transferring at least two preforms so as to collect them on the pitch-modification mechanism when the preforms are spaced apart by the second pitch and to feed them into a mold;

the machine being characterized by the fact that the pitch-modification means comprise at least two adjacent movable devices, each fitted with a preform position-retention element and arranged so as to be able to convert the position-retention elements to the first pitch when the latter are positioned opposite the drive mechanism, and to the second pitch when they are positioned facing the transfer apparatus.

This configuration allows simultaneous action to be exerted on more than two successive preforms, since it is possible to control several successive movable devices in order to cause them to move from the first to the second pitch.

Another advantage of the invention lies in the fact that pitch-modification means can be formed from a wheel incorporating only movable notches, thereby reducing the production costs entailed by machining stationary notches on the casting forming the wheel.

Advantageously, the invention further makes possible a larger amplitude of variation of the pitch, contrary to the device specified in the patent application mentioned above, in which the pitch-variation amplitude is restricted because of stationary notches located on either side of a movable notch on the periphery of the wheel.

Other features and advantages of the invention will emerge from the following description provided with reference to the attached drawings, in which.

In accordance with the embodiment illustrated in the different figures, the invention concerns a machine for container manufacture by means of blow-molding or stretch-forming/blow-molding of plastic preforms 1, which are preliminarily produced, for example, by injection in an injection machine.

Figure 1:
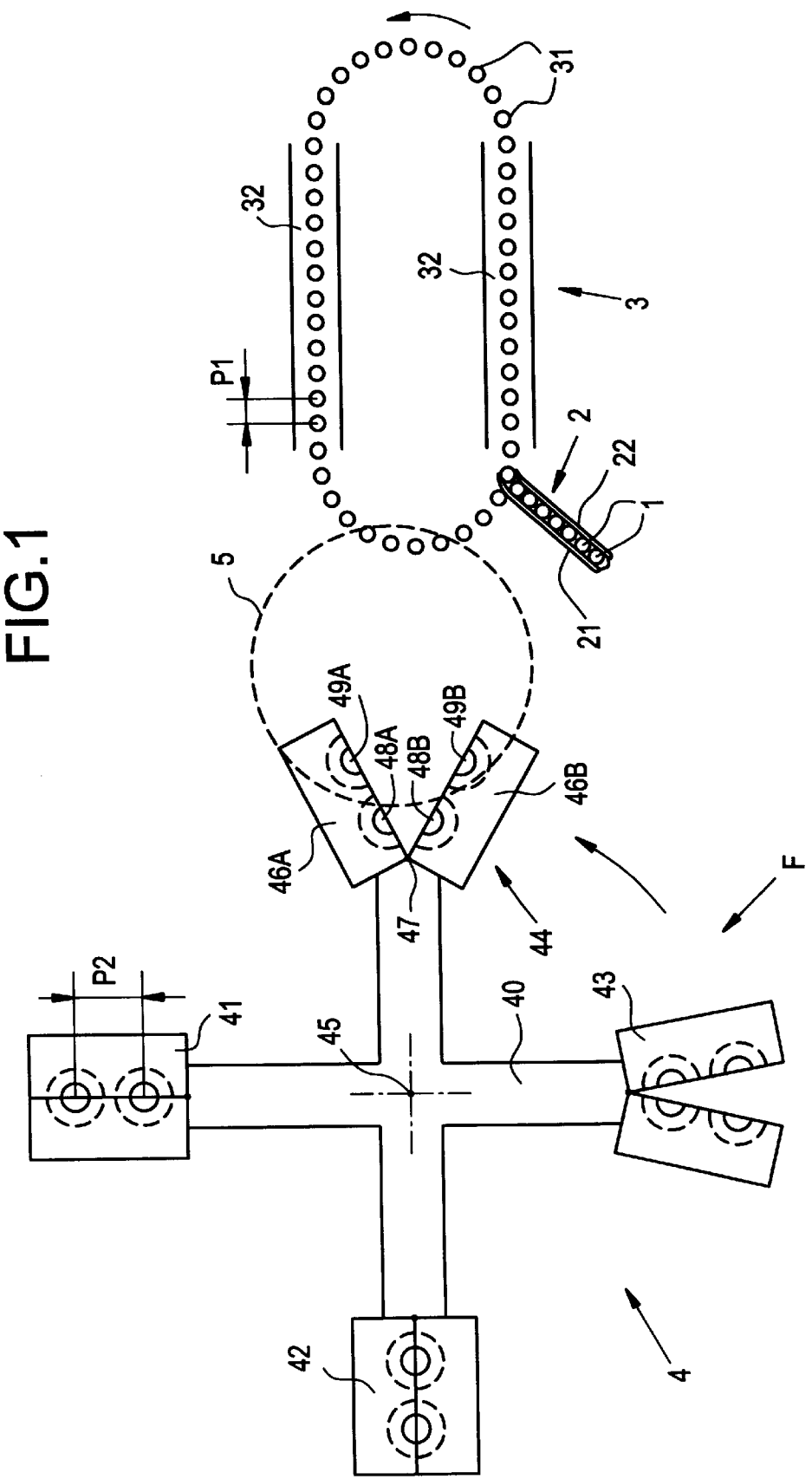
FIG. 1 is a skeleton diagram of a machine according to the invention.

In FIG. 1, the preforms are fed from one or several storage containers or hoppers (not shown) using a feed mechanism 2, such as a chute incorporating slide-tracks 21, 22, to a heat-treatment device 3, such as an infrared radiation furnace, where they are heated so as to be softened for the purpose of blow-molding.

The heat-treatment device 3 possesses a conventional structure. It may be linear or circular and comprises an element, such as an endless chain, comprising, first, multiple pre-form holding devices 31 spaced evenly apart by a first pitch P1, each of which is designed to hold a preform, and second, one or several zones 32 incorporating heating means (not shown), in front of which the preforms are exposed during travel of the holding devices.

These conventional holding devices are not illustrated in detail. They may, for example, be rotating devices comprising a spindle and an elastic ring.

For known practical reasons (i.e., presence of a collar enabling them to be supported in the aforementioned slide-tracks), the preforms are preferably fed into the heat-treatment device 3 where each is positioned on a turning device, the opening pointing upward. The machine comprises means for reversing the preforms so that the opening thereof points downward during the entire duration of the heat treatment, to avoid softening of the neck of the preform. These means consist, for example, of a conventional reversing mechanism positioned on the path of the endless chain, for example the mechanism described in French Patent No. 8905885 in the Applicant's name. Furthermore, and preferably again, the preforms are repositioned with the opening pointing upward between the outlet of the heat-treatment station and the container blow-molding station. To this end, another reversing mechanism is positioned between the last heating element of the heat-treatment device and the blow-molding station. Preferably, this device, for example that described in French patent No. 8905885, may be placed in the endless chain. A variant may comprise any other suitable equivalent device.

After heat treatment and repositioning the opening so as to point upward, each preform is removed (undonned) from the turning device which carries it, then transferred to the blow-molding station 4 by means of an interface device 5, to be described in detail below. After blow-molding, the containers produced are then carried away using a suitable apparatus (not shown on this skeleton diagram), which is located, for example, at the site of the arrow F.

The blow-molding station 4 is formed by a circular conveyor 40 incorporating at least two wallet-type molds 41, 42, 43, 44, which are spaced around the vertical axis of rotation 45 of the circular conveyor, each of which comprises at least two blow-molding cavities.

Each mold 41, 42, 43, 44 consists of two half-molds 46A, 46B which, to allow opening and closing, are jointed using conventional means (not shown) around a spindle 47 borne by the circular conveyor. As a non-limiting example, the mold may be opened and closed using means identical or equivalent to those described in French Patent Application No. 2 479 077 (incorporated herein by reference), that is, using a mechanism comprising an arm which swivels in the circular conveyor 40 and is controlled by a roller working in conjunction with a cam which is stationary in relation to the circular conveyor.

Each half-mold incorporates as many half-cavities as the mold comprises cavities. In the example shown in which each mold comprises two cavities, each half-mold 46A, 46B comprises two half-cavities 48A, 49A; 48B, 49B, respectively.

Preferably and in conventional fashion, whatever the final shape of the container to be shaped or necessarily when the final shape prevents ease of unmolding (for example, because of a petal-shaped bottom), each mold is linked to bottom-closure means.

In the heat-treatment device 3, the preforms are continually spaced apart by a first pitch P1, the pitch being defined as the distance which separates the longitudinal axes of two successive preforms or, what amounts to the same thing, the distance separating the longitudinal axes of the holding devices of two successive preforms in this apparatus.

In the blow-molding station 4, two successive cavities in the same mold are spaced apart by a second pitch P2, which is greater than the first pitch P1 and is calculated so as to take into account, first, the radial expansion of the preforms during blow-molding, and second, the need to leave a sufficient thickness of material between two cavities, in order to ensure that the mold possesses the proper mechanical strength during blow-molding. As mentioned above, the preforms are positioned as closely together as possible in the thermal treatment device; accordingly, the pitch is smaller than the pitch existing in the blow-molding station. In this way, the heat-treatment station is as small as possible, given the total output desired for the machine. As a result, the aforementioned interface device 5 comprises not only means for transporting the preforms to the blow-molding station 4, but also means for ensuring modification of the pitch of the preforms after the heat treatment thereof.

As an example, the first pitch P1 may be approximately 50 millimeters, and the second pitch P2 may be approximately 80 millimeters or more.

Figure 2:
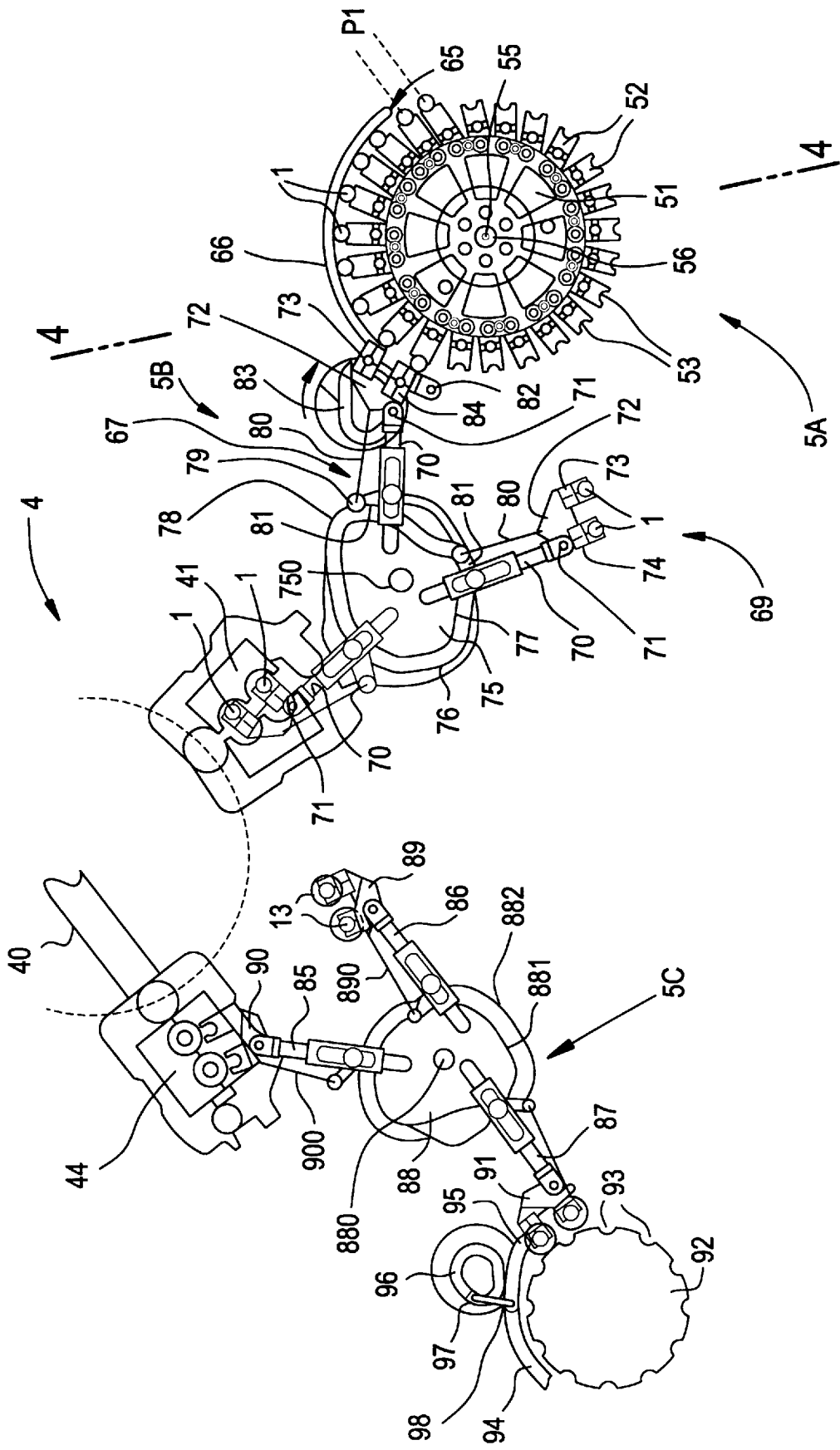
FIG. 2 is a top view of a portion of the machine, showing a preferred embodiment of the pitch-modification means and the mechanism allowing preform transfer to the molds, on the one hand, and illustrating a possible embodiment of the container-unloading mechanism, on the other.
Figure 3:
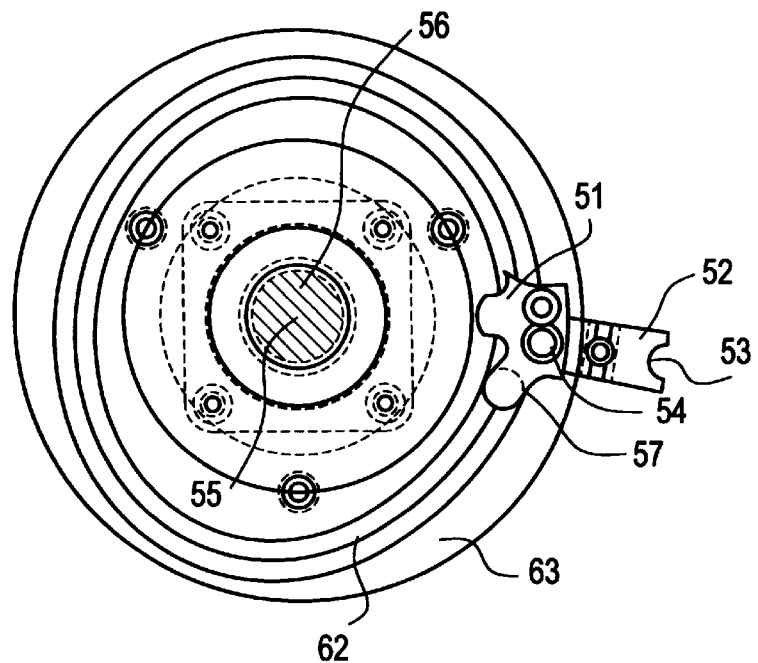
FIG. 3 is a top, partially exploded, view of the pitch-modification means in FIG. 2.

FIGS. 2 and 3 illustrate a preferred embodiment of the interface device according to the invention, this device being configured to permit the gripping, pitch modification, and transfer of at least two preforms.

In this embodiment, the interface device 5 comprises at least two additional series of mechanisms: first pitch-modification means 5A in which the preforms arrive spaced apart by pitch P1, then are moved away from each other, after undonning, in order to convert to pitch P2, and second means 5B comprising at least the device 67, 68, 69 designed to transfer the preforms 1 to molds after they have been adjusted to the second pitch P2.

In the embodiment shown, the first means 5A comprise, first, a wheel 51 incorporating over its entire periphery movable devices 52, which are evenly spaced apart, each having a preform position-retention element 53; and second, an additional component 66 serving as a guide, which will be described below. Each movable device 52 is mounted on the wheel 51 in such a way that it can be moved closer to, or farther away from, the adjacent movable device. Consequently, the position-retention element 53 which it carries may move closer to and farther away from the position-retention element belonging to each adjacent device, thereby causing modification of the pitch.

The position-retention elements are notches 53 which hold the preforms 1 in place by means of a collar 11 (shown in FIG. 4) located beneath the necks 12 of the preforms.

The movable devices 52 consists of identical plates, for example plates having a substantially rectangular shape. A first end of each plate is mounted so as to rotate around a spindle parallel to the central axis of rotation 55 of the wheel and in proximity to the periphery of the wheel 51. The preform-retention notch 53 incorporated into a plate is provided at the end opposite the end in which the axis of rotation 54 of the plate is located, as shown in FIGS. 2 and 3. The axes of rotation 54 of the plates are evenly spaced in proximity to the periphery of the wheel 51, thereby delimiting a circle concentric to the axis of rotation 55 of the wheel 51. By virtue of this configuration, any rotational motion of a plate around its axis causes a change of pitch between the position-retention element 53 associated with it and the element ensuring position-retention of each of the two adjacent plates.

As will be shown below, the rotational movement of one plate is made possible by a mechanism linked to the plate and to a stationary part of the machine, so that the angular position of any single plate in relation to the wheel 51 depends on the angular position of the wheel in relation to the machine.

Rotation of the wheel 51 around its axis in synchronism with the rest of the machine is made possible by a shaft 56 to which the rotational movement of the motor belonging to the machine (not shown) is transmitted by conventionally-known means (belts, pinions, etc.) (also not shown).

FIG. 3 is a top view partially illustrating the pitch-modification means 5A, in particular a portion of the wheel 51 and the mechanism controlling the rotation of a single plate in relation to the wheel.

Figure 4:
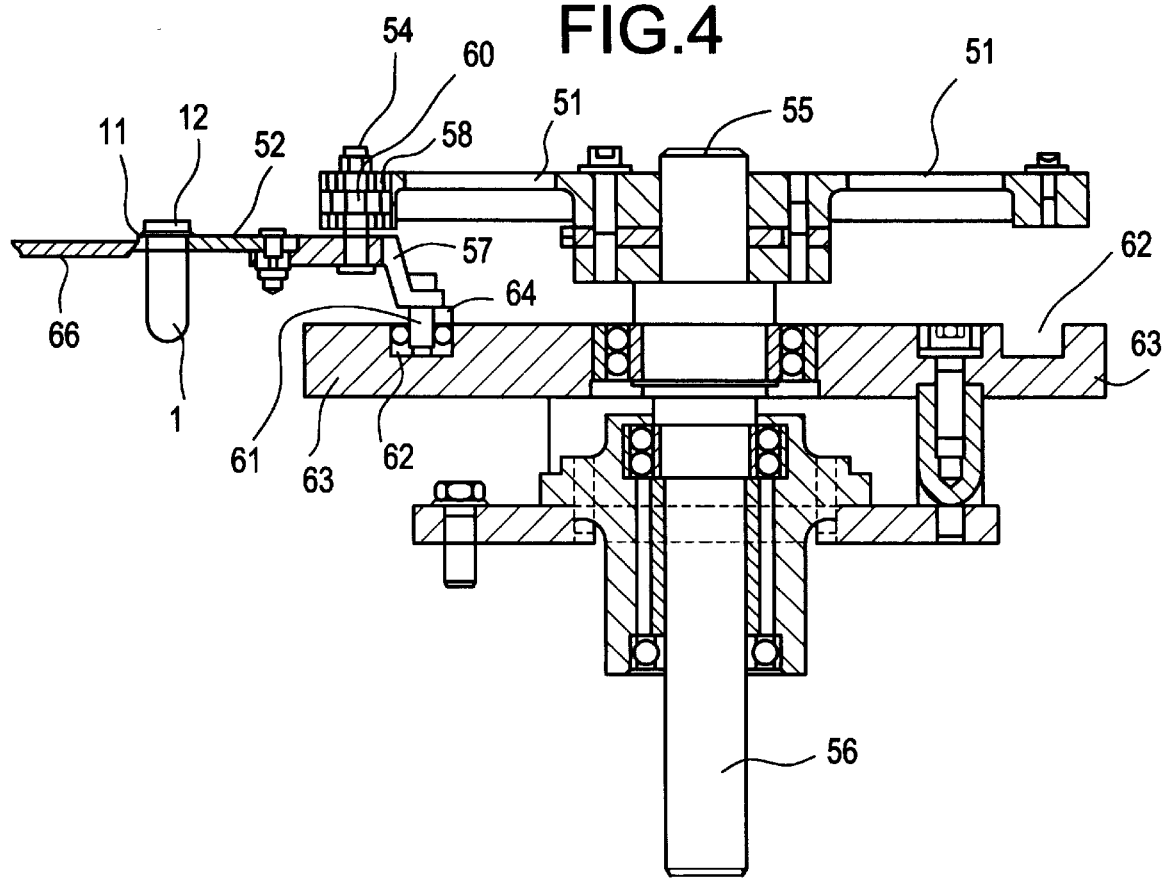
FIG. 4 is a partial view along cross-section 4—4 in FIG. 2 of an embodiment of the pitch-modification mechanism.

FIG. 4 is a partial cross-section of the wheel and of one movable device it carries. These FIGS. 3 and 4 show how each plate 52 is made to rotate around its respective axis 54 in relation to the wheel 51, when the latter is itself rotating.

Each plate is linked to a crank 57 so as to ensure the rotation thereof, and thus modification of the pitch with respect to the adjacent plates. A first end 60 of the crank linked to a single plate is, first, made firmly integral with the plate at the location of the axis of rotation thereof 54, and second, mounted so as to rotate freely on the wheel 51 by means of a rolling bearing system 58, for example. Thus, any movement of the crank causes rotation of the plate in relation to the wheel 51.

The second end 61 of the crank is engaged in a guide cam 62 made integral with the frame of the machine. The cam is, accordingly, stationary in relation to the machine. In the embodiment illustrated in FIGS. 3 and 4, the cam 62 consists of a groove made in the thickness of a disk 63 which is stationary in relation to the rest of the machine and is positioned around the drive shaft 56 of the wheel 51 and beneath and in a plane parallel to the latter. This groove 62 forms a closed loop exhibiting variations in its radius of curvature, so that, when the wheel 51 is rotated, the second end 61 of each crank follows the variations of the curvature of the groove made in the stationary disk 63. Accordingly, each time that the second end 61 of a crank encounters a change of curvature in the groove, the result is rotation of the first end 60 thereof, and, therefore, a movement of the associated plate 52 and, in consequence, a change of pitch between the notch 53 in the associated plate 52 and the notches of the two adjacent plates. Since all of the plates are fastened and jointed in the same manner to the turning disk (axes of rotation borne by a circle concentric to the axis of the disk and identical cranks), they all possess identical kinematics, which are, however, phase-shifted from one plate to the other. It is, therefore, the contour of the cam which determines the relative motion of the plates among themselves. Thus, it is possible that more than two successive plates are adjusted to the first pitch P1 or to the second P2.

As illustrated in FIG. 4, which is a partial cross-section along 4—4 in FIG. 2, the second end 61 of each crank is preferably guided in the cam 62 by means of a roller 64, which is mounted around this end.

Since pitch modification can take place only after the undonning operation, it will easily be understood from studying FIGS. 2 to 4 that the notches 53 associated with the plates 52 belonging to the wheel 51 are not sufficient to hold the preforms on the periphery of the wheel. For this reason, an additional position-retention element 66, which, in the preferred embodiment, consists of a portion of a ring, is positioned on the periphery of the wheel opposite the entire area in which the preforms travel, between the time when these preforms are positioned on the notches and the moment when they are gripped by the second means 5B. The portion of the ring is moved away from the notches by a distance such that the preforms can be moved along this element when the wheel 51 rotates, while at the same time each preform is supported beneath the neck thereof 11 between a notch and this element 66 (FIGS. 2 and 4).

As previously indicated, the interface device 5 comprises, in addition to the pitch-modification mechanism 5A, at least the mechanism 5B, including at least one transfer element 67, 68, 69 designed to grasp the preforms 1 at a pitch of P2 and to transfer them to the molds. As a result, under the supposition that the wheel 51 rotates in the direction illustrated by the arrow 65 in FIG. 2 and that the preforms meet the wheel at the spot indicated by the tip of the arrow, the cranks 57 and the cam 62 are configured so that the movable position-retention elements 52 are set to pitch P1 at the spot of the arrow, and to pitch P2 at least in the area in which a transfer element (67 in FIG. 2) belonging to the means 5B grasps the preforms.

Preferably, because of the high speeds of the machine, the mechanism 5B incorporates several identical transfer elements 67, 68, 69. Accordingly, in the embodiment illustrated in FIG. 2, they comprise three transfer elements.

Each element comprises an arm 70 at a first end of which a holding device 72 incorporating as many pairs of clamps 73, 74 as each mold belonging to the circular conveyor has cavities is jointed so as to rotate by means of a pivot pin 71. Accordingly, in the embodiment illustrated in FIG. 2, each arm supports two pairs of clamps, whose centers are spaced apart by the second pitch P2.

In a preferred embodiment, each clamp is spring-activated and opens because of the force exerted by the necks of the preforms at the moment when a preform is inserted therein or removed therefrom, and it recloses because of the action of the springs which attach it to its holding device.

In a variant, the opening and/or closing of each clamp is controlled by a suitable mechanism.

Spring-loaded closing mechanisms and opening and/or closing control mechanisms are known and used in conventional machines. Adaptation of these mechanisms for use in the invention in question poses no difficulties for those skilled in the art. Accordingly, these devices are not shown and described in greater detail.

The second end of the arm 70 is mounted so as to rotate and move in translational motion on a base 75 which itself rotates around an axis 750 in synchronism with the rest of the machine. The rotational and translational movements of the second end of the arm are permitted in conventional fashion by the use of cams 76, 77, which are stationary in relation to the machine, actuating rollers which are connected to the arm and guided by these cams.

This arrangement is produced, in particular, so that, when the preforms are grasped, the movement of the first end of the arm is controlled by rotation of the disk, thereby ensuring that the first end, and thus the clamps, travel in conjunction with the disk over a distance sufficient to ensure as perfect a gripping action as possible.

This arrangement is further produced so that another control mechanism, this time between the movement of the first end of the arm and a mold-carrier, is actuated at the time of transfer of the preforms into the cavities of each mold and until complete closure of the mold, thus ensuring perfect positioning of the preforms in the cavities.

In addition, variation of the length of the arm, which is permitted by the rotational and translational movements, optimizes the space required by these arms as they move.

However, since each arm supports at least two clamps, control of the movement of the first end of the arm 70 does not suffice by itself to guarantee that the preforms 1 will be gripped and held on the pitch-modification means 5A, nor that the preforms will be transferred to the molds. For this reason, the rotational and translational movements of each arm are accompanied by rotation of the clamp-holding device 72 in relation to this arm, thus continuously allowing correct positioning of the clamps and the accompanying movement both of the disk when the preforms are gripped and of the molds during transfer and the closure thereof.

This rotation of the device 72 holding each clamp is carried out by means of a third cam 78 which is stationary in relation to the rotating base 75. This cam 78 actuates another roller 79, which is connected to a first end of a first connection rod 80, whose second end is connected to the clamp holding device 72, and by means of a second connection rod 81, which connects the roller 79 to the second end of the arm 70.

FIG. 2 illustrates one 68 of the three transfer arms positioned in a mold 41.

In the embodiment illustrated in FIG. 2, the end of the position-retention element 66 provided in addition to the notches 53 is extended by a moving part 82 which retracts after the preforms have been grasped by the clamps. The presence of this moving guide member 82 facilitates the kinematics of each of the arms 67, 68, 69, by making it unnecessary for them to have to travel in conjunction with the notches until the last preform they grip releases completely from this position-retention element 66. In the embodiment illustrated, this moving part 82 is another portion of a ring, which is mounted so as to rotate in proximity to the end of the additional position-retention element 66 located on the side on which the arms grasp the preforms. When the clamps connected to an arm have yet to grip the preforms, the moving part 82 forms an extension of the additional element. As soon as the preform is grasped, the moving part 82 moves away.

A cam rotating in synchronism with the machine actuates a connection rod 84 connected to the moving part 82. The cam profile is such that the moving part 82 remains in the preform-holding position for as long as the gripping operation has not been completed, then moves away following completion of this operation and returns to a proximate position until the following preforms are grasped.

After blow-molding in the molds, the containers 13 can be unloaded using a device 5C comprising one or several transfer elements possessing a structure similar to those 67, 68, 69 used to load the preforms. Each element comprises an arm 85, 86, 87 mounted so as to move in rotational and translational motion around a single support device 88, which itself rotates around an axis 880, and each arm is jointed to a support device 89, 90, 91 having as many gripping mechanisms, such as pairs of clamps, as there are cavities in each mold. The clamps grasp the containers 13 by the neck when these containers leave the molds.

A mechanism incorporating cams 881, 882, rollers, and connection rods 890, 900, 910 enables movement of the clamps to be controlled by the rotation of a mold during a forward motion required for the proper gripping of the containers, and then allows the containers to be unloaded, for example on a wheel 92 incorporating notches 93 and a supporting device 94 shaped like a portion of a ring which supplements the notched wheel.

Preferably, a component 95 shaped like a portion of a ring forms an extension of the supplementary supporting device 94. This component is connected to a mechanism incorporating a cam 96, a roller 97, and a connection rod 98, the cam being actuated in synchronism with the rest of the machine. The component 95 retracts when acted upon by a mechanism incorporating a cam 96, a roller 97, and a connection rod 98 at the moment when the clamps move to the notched wheel, and it is positioned when these clamps have become properly engaged, so as to facilitate gripping of the containers by the notched wheel. The containers, which are moved by the neck between the notched wheel and the supplementary device 93, are then forcibly removed from the clamps, as the transfer element continues to rotate in an intersecting direction.

Figure 5:
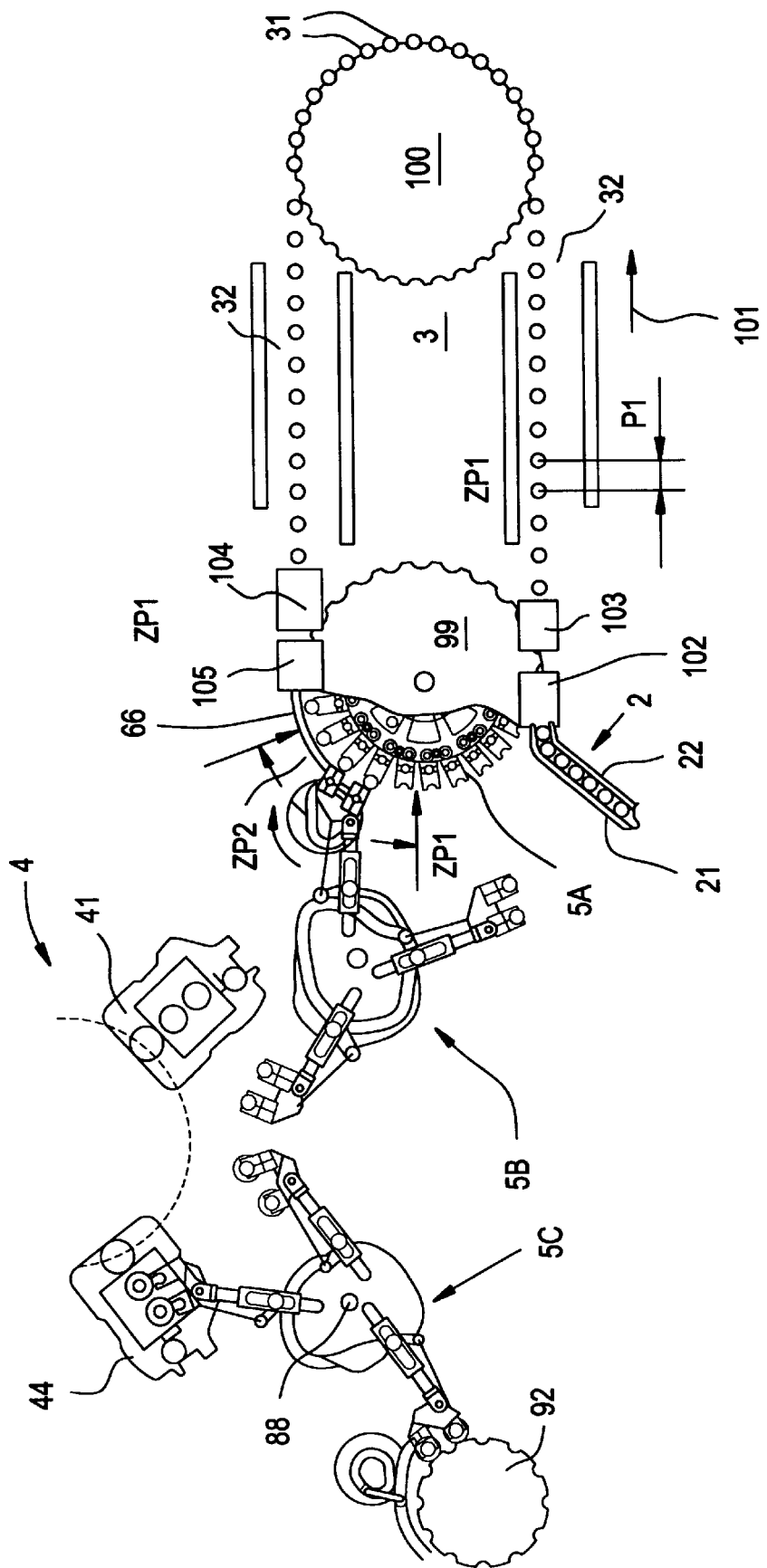
FIG. 5 is a diagram showing the preferred mounting of the elements in FIGS. 2 to 4 in a machine incorporating a linear heat-treatment device.

FIG. 5 illustrates a preferred configuration of the elements according to the invention, in the case in which the heat-treatment apparatus 3 is linear; that is, in which the endless chain of turning elements 31 possessing a known structure has at least two linear sectors opposite which are located the heating areas 32 and is stretched between two disks or wheels, a first 99 serving to drive this chain in synchronism with the rest of the machine, and a second 100 designed to maintain tension and to return the chain.

The pitch-modification mechanism 5A, which consists of the wheel 51 supporting the moving plates 52 incorporating notches 53, is positioned coaxially to the first disk 99 driving the chain of turning device 31 and beneath the latter, and the wheel is driven in conjunction with this disk 99. As explained below, this arrangement allows donning and/or undonning to be performed while the preforms are positioned opposite the wheel 51.

FIG. 5 illustrates the first disk 99 in an exploded view, so that the wheel 51 is at least partially visible.

Under the supposition that the heat-treatment apparatus 3 is driven in the direction shown by the arrow 101, the feed mechanism 2 sends the preforms 1, the opening pointing upward, onto the wheel 51 in an area ZPI, where the spacing between notches 53 equals the first pitch P1, so that each notch, and thus each preform reaching this wheel 51 in this area ZPI, is positioned opposite the mechanism, which consists, for example, of a spindle and an elastic ring, designed to don a turning device.

Each preform contained in the feed mechanism is then grasped by the notch 53 in a plate 52, then moved to a donning zone 102 using conventional means, for example a cam-equipped device (not shown) which lowers the spindle and the elastic ring associated with each successive turning device into the necks of the preforms.

Next, the preforms travel into a zone 103 in which they are reversed using conventional means, so that the opening points downward within the heating areas 32.

After heat treatment and before reaching once again the pitch-modification mechanism 5A, the preforms are preferably reversed again in a zone 104, using conventional means, and are positioned bottom downward, before coming back into contact with the notches 53 on the wheel 51.

Next, after being positioned once again—still in the area ZPI in which the spacing between notches equals the first pitch P1—between a notch and the additional position-retention element 66 (i.e., the portion of a ring shown in FIG. 2), each preform undergoes undonning, one after the other, in a zone 105. At this stage, each preform is then transported solely by its neck between a notch and the supplementary position-retention element 66.

The preforms then enter an area ZP2, in which they are adjusted to the second pitch P2, before being grasped by the second mechanism 5B comprising the elements 67, 68, 69 designed to transfer the preforms to the molds.

It emerges from the foregoing description that, in this embodiment, the cam 62 guiding the cranks 57 must be contoured in such a way that the position-retention elements, such as the notches 53, are spaced apart by the first pitch P1 at the time of donning/undonning.

Furthermore, this cam must be contoured so that the position-retention elements are adjusted to the second pitch P2 at least when the clamps 73, 74 belonging to the device for transfer of preforms to the molds is in contact with the preforms.

On the other hand, it is not necessary, but merely preferable, that the cam be contoured so that the preforms are fed into an area of the pitch-modification mechanism 5A in which the notches are spaced apart by the first pitch P1. In fact, it is entirely conceivable that the preforms could be fed into an area in which the pitch differs from this pitch P1, or even from the pitch P2, adjustment to the first pitch P1 then occurring between the moment when the preforms are grasped by a notch and the moment of donning.

In a variant (not shown), the preform-feed device 2 send the preforms, not directly to the pitch-modification mechanism 5A, but to an intermediate loading wheel.

Figure 6:
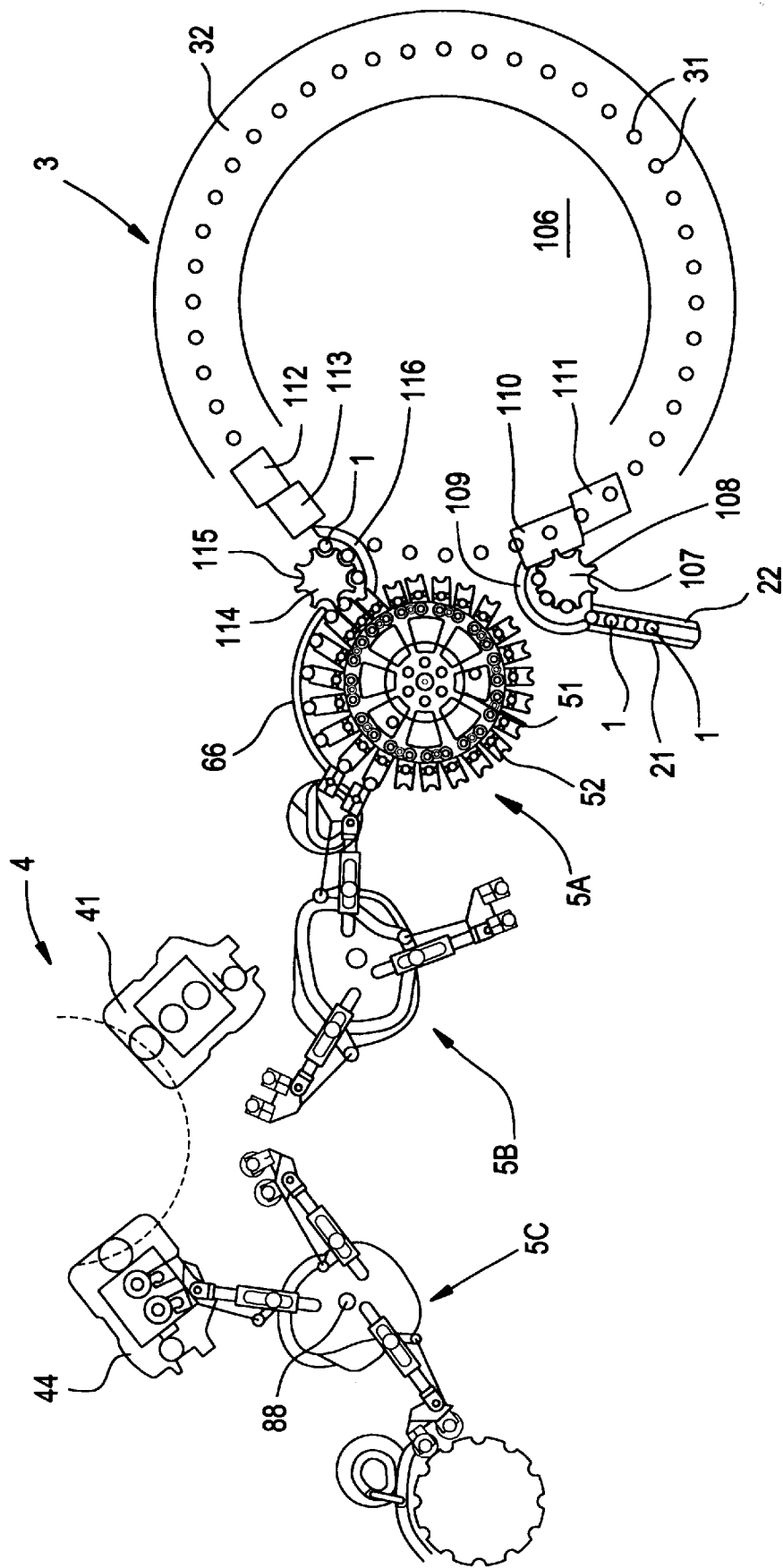
FIG. 6 is a diagram illustrating possible mounting of the elements in FIGS. 2 to 4 in a machine incorporating a circular heat-treatment device.

FIG. 6 illustrates a possible arrangement of the elements according to the invention in a machine in which the heat-treatment device is circular and built around a circular conveyor 106.

The loading, donning, and treatment means are known. Thus, the feed device 2 sends the preforms to an intermediate wheel 107 incorporating recesses and to a supplementary support device 109 in the form of a portion of a ring. Each preform supported beneath its neck by a recess 108 and by the supporting device 109 is transported to a donning area 110, then to a reversing area 111 located before the heat-treatment zones 32.

After heat treatment, the preforms reach a conventional reversing area 112, then an undonning area 113, also conventionally known, before being taken up by a transfer/pitch-modification mechanism comprising, first, at least one intermediate wheel 114 incorporating stationary notches 15 and a supplementary supporting device 116 in the form of a portion of a ring, which enables the preforms to be transported beneath the necks thereof by the notches 115 and the supporting device 116; and second, the pitch-modification means 5A consisting of the wheel 51 and the 52 movable plates belonging thereto and incorporating notches 53.

In the event that several intermediate wheels 114 are provided, each is associated with an additional, separate supporting device 116 shaped like a portion of a ring. Accordingly, the preforms are held continuously between the moment they leave the heat-treatment apparatus and the moment they move onto the pitch-modification mechanism 5A.

Located before the pitch-modification mechanism 5A is the second mechanism 5B incorporating transfer elements 67, 68, 69 designed to grasp the preforms after they have been adjusted to the second pitch P2 and to transfer them to the molds.

The invention is obviously not limited to the embodiments described and claimed, but encompasses the equivalents thereof and all variants and adaptations falling within the capability of those skilled in the art.

We claim:

1. Machine for the manufacture of containers (13) by blow-molding preliminarily-injected preforms (1), comprising:
    a device (3) for conveying and holding in position preforms along a path on which a heat-treatment station (32) is positioned, with means (31) designed to keep two successive preforms spaced apart by a first pitch (P1);
    at least two molds (41, 42, 43, 44) arranged on the periphery of a blow-molding circular conveyor (4), in which the molds are wallet molds, each comprising at least two mold cavities (48A, 48B; 49A, 49B) and in which the longitudinal axes of two adjacent cavities are spaced apart by a second pitch (P2);

means (5A) for modifying the pitch of the preforms, in order to convert them from the first pitch (P1) to the second pitch (P2);

first means (5B) for transferring at least two preforms so as to collect them on the pitch-modification means when the preforms are spaced apart by the second pitch and to feed them into a mold;

wherein the pitch-modification means (5A) comprises at least two adjacent movable devices (52), each fitted with a preform position-retention element (53) and arranged so as to be able to convert the position-retention elements to the first pitch (P1) when the position-retention elements are positioned opposite the device for conveying and holding the preforms, and to the second pitch (P2) when the position-retention elements are positioned facing the first transfer means.

2. Machine according to claim 1, wherein the first pitch (P1) between the longitudinal axes of two successive preforms in the heat-treatment apparatus is smaller than the pitch (P2) between the longitudinal axes of two adjacent cavities in a single mold.

3. Machine according to claim 2, wherein the pitch-modification means (5A) comprises a wheel (51) comprising, on the periphery thereof, a succession of preform position-retention elements (53).

4. Machine according to claim 3, wherein the position-retention elements (53) are notches, and wherein said machine comprises, on the periphery of the notches, a supplementary position-retention element (66) comprising a portion of a ring, which enables the preforms (1) to be transported by the necks (11) thereof between the notches and this supplementary element, between the moment of undonning and the moment when the performs are grasped by the first transfer means (5B) following modification of pitch.

5. Machine according to claim 4, wherein the notches (53) are evenly spaced on the periphery of the wheel (51).

6. Machine according to claim 4, wherein the notches (53) are produced in identical plates (52) which are mounted so as to rotate on the wheel, and wherein it comprises means (57, 62, 63) arranged so that, at any moment, the position of any plate in relation to the adjacent plates, and, accordingly, the position of one notch in relation to the notches on the adjacent plates, depends on the position of the wheel (51) in relation to the machine.

7. Machine according to claim 6, wherein the axes of rotation (56) of the entire set of plates are evenly spaced on the wheel (51) and delimit a circle concentric to the axis of rotation (57) of this wheel (51).

8. Machine according to claims 6, wherein each plate (52) is associated with a respective crank (57) in order to ensure the rotation thereof in relation to the wheel and, accordingly, the modification of pitch, one first end (60) of the crank associated with a plate being made integral with the axis of rotation (56) of this plate, and a second end (61) being engaged in a guide cam (62) made integral with the machine frame.

9. Machine according to claim 8, wherein the cam (62) consists of a groove, which forms a closed loop, made in the thickness of a disk (63) which is stationary in relation to the rest of the machine, the cam exhibiting variations in its radius of curvature, so that, when the wheel (51) is rotated, the second end (61) of each crank (57) follows the variations of the curvature of the cam made in the stationary disk, thus causing rotation of the associated plate in relation to the wheel (51), and, therefore, a variation of the spacing of this plate in relation to the adjoining plate and, in consequence, a modification of pitch between the notches of the plates in question.

10. Machine according to claim 1, wherein the first transfer means (5B) includes at least one first arm (70), of which a first end supports as many preform-gripping mechanisms, comprising pairs of clamps (73, 74), as there are cavities in a mold, the pitch between the centers of two successive gripping devices belonging to a single arm being identical to the pitch (P2) between the longitudinal axes of two successive cavities in a single mold.

11. Machine according to claim 1, wherein said machine comprises second transfer means (5C) designed to remove the containers (13) from the molds.

12. Machine according to claim 11, wherein the second transfer means (5C) includes at least one second arm (85, 86, 87), of which a first end supports as many container (13)-gripping devices, comprising pairs of clamps, as there are cavities in a mold, the pitch between the centers of two successive gripping devices being identical to the pitch (P2) between the longitudinal axes of two successive cavities in a single mold.

13. Machine according to claim 11, wherein the preform-gripping means (73, 74) are borne by a first base (72) mounted so as to rotate on the first end of the first arm (70), and/or the container (13)-gripping means are borne by a second base (89, 90, 91), which is mounted so as to rotate on the first end of the second arm (85, 86, 87).

14. Machine according to claim 13, wherein the second end of the first arm (70) is mounted on a third base (75) which rotates on an axis (750) parallel to that of the circular conveyor (4) holding the molds, and/or the second end of the second arm is mounted on a fourth base (88) which rotates around an axis (88) parallel to that of the circular conveyor holding the molds, and wherein said machine comprises means enabling the first arm (70) and/or the second arm (85, 86, 87) to describe movements of rotation and translation in relation to the respective rotating base thereof.

15. Machine according to claim 13, wherein the movements of rotation of the first base (72) supporting the preform (1)-gripping means and/or of the second base (89, 90, 91) supporting the container (13)-gripping means at the first end of the first and/or of the second arm are controlled by means (79, 80; 890, 900, 910) made integral with each rotating base (75, 88).

16. Machine according to claim 14, wherein the means enabling the first and/or second arm to perform the movements of rotation and translation in relation to the respective rotating base thereof, and/or the means enabling the base of each gripping device to perform the movements of rotation in relation to the respective arm thereof comprise cams (76, 77, 881, 882) borne by the respective rotating base, which act on supplementary devices, comprising rollers and connecting rods (80, 890, 900, 910) which are made integral with the respective arm.

17. Machine according to claim 3, wherein said machine comprises a linear heat-treatment device and an endless chain of preform holding devices (31) stretched between two wheels (99, 100), in which two successive holding devices (31) are spaced apart by a first pitch (P1), and wherein the wheel (51), which incorporates on its circumference the movable preform-retention elements (52), is positioned beneath one of said tension wheels and coaxially thereto, moves with it, and is configured so as to be used to support the preforms during a donning phase (102) thereof and/or to hold in place the preforms between an undonning phase (105) and the moment when they are gripped by the first transfer mechanism.

18. Machine according to claim 17, wherein the pitch-modification means are configured so that the movable preform-holding elements are spaced apart by the first pitch (P1), at least in the donning (102) and/or undonning (105) areas.

19. Machine according to claim 4, wherein said machine comprises a circular heat-treatment device and an endless chain of preform-holding devices (31) supported by a circular conveyor (106), in which two successive preform-holding devices are spaced apart by a first pitch (P1), and wherein the pitch-modification means (5A), which comprise the wheel (51) and its movable notch (53)-incorporating elements and the supplementary element (66) having a shape of a portion of a ring, are positioned on the circumference of the circular conveyor, so as to grasp and move in conjunction with the preforms after the undonning thereof (113), until they are grasped by the first transfer mechanism (5B).

20. Machine according to claim 19, wherein at least one wheel (114) incorporating stationary notches (115) and a supporting device (116) having a shape of a portion of a ring partially encircling said wheel (114) are interposed between the heat-treatment apparatus and the wheel (51), the preforms being kept at the first pitch (P1) on the wheel or wheels (114) incorporating stationary notches.

21. A machine for the manufacture of containers by blow-molding preliminarily-injected preforms, comprising:
- a conveying device which conveys preforms along a path on which a heat-treatment station is positioned, and which includes preform holding devices to hold two successive preforms spaced apart by a first pitch (P1);
- at least two molds arranged on the periphery of a blow-molding circular conveyor, in which the molds are wallet molds, each comprising at least two mold cavities and in which the longitudinal axes of two adjacent cavities are spaced apart by a second pitch (P2);
- a pitch-modification mechanism which modifies the pitch of the preforms, in order to convert them from the first pitch (P1) to the second pitch (P2);
- a transfer mechanism which transfers at least two preforms so as to collect them on the pitch-modification mechanism when the preforms are spaced apart by the second pitch and to feed them into a mold;
- wherein the pitch-modification mechanism comprises at least two adjacent movable devices, each fitted with a preform position-retention element and arranged so as to be able to convert the position-retention elements to the first pitch (P1) when the position-retention elements are positioned opposite the conveying device, and to the second pitch (P2) when the position-retention elements are positioned facing the transfer mechanism.

* * * * *